United States Patent
Yu et al.

(10) Patent No.: US 10,338,751 B2
(45) Date of Patent: Jul. 2, 2019

(54) TOUCH-CONTROL PATTERN STRUCTURE, MANUFACTURE METHOD THEREOF AND TOUCH PANEL CONTAINING THEREIN

(75) Inventors: Jing Yu, Xiamen (CN); Huilin Ye, Xiamen (CN); Rongwu Wang, Longyan (CN)

(73) Assignee: TPK Touch Solutions (XIAMEN) Inc., Xiamen (CN)

( * ) Notice: Subject to any disclaimer, the term of this patent is extended or adjusted under 35 U.S.C. 154(b) by 920 days.

(21) Appl. No.: 13/299,362

(22) Filed: Nov. 18, 2011

(65) Prior Publication Data

US 2012/0299867 A1 Nov. 29, 2012

(30) Foreign Application Priority Data

May 27, 2011 (CN) .......................... 2011 1 0157883

(51) Int. Cl.
*G06F 3/044* (2006.01)
*G06F 3/045* (2006.01)

(52) U.S. Cl.
CPC .... *G06F 3/044* (2013.01); *G06F 2203/04103* (2013.01); *G06F 2203/04111* (2013.01)

(58) Field of Classification Search
CPC .. G06F 2203/04111; G06F 2203/04112; G06F 3/045; G06F 3/044; G06F 2203/04103; B05D 5/12
See application file for complete search history.

(56) References Cited

U.S. PATENT DOCUMENTS

| | | | | |
|---|---|---|---|---|
| 6,473,235 | B2* | 10/2002 | Toyoshima et al. | 359/585 |
| 8,420,970 | B2* | 4/2013 | Chang et al. | 200/600 |
| 2007/0262962 | A1* | 11/2007 | XiaoPing et al. | 345/173 |
| 2008/0277259 | A1* | 11/2008 | Chang | G06F 3/044 200/600 |
| 2010/0045625 | A1* | 2/2010 | Yang et al. | 345/173 |
| 2011/0071396 | A1* | 3/2011 | Sano et al. | 600/443 |
| 2011/0090172 | A1* | 4/2011 | Kaya et al. | 345/174 |
| 2011/0096018 | A1* | 4/2011 | Lee | G06F 3/044 345/174 |
| 2011/0134055 | A1* | 6/2011 | Jung | G06F 3/044 345/173 |
| 2011/0148780 | A1* | 6/2011 | Lu et al. | 345/173 |
| 2011/0193793 | A1* | 8/2011 | An | G06F 3/044 345/173 |
| 2012/0182250 | A1* | 7/2012 | Nagata | G06F 3/044 345/173 |

FOREIGN PATENT DOCUMENTS

| | | |
|---|---|---|
| CN | 201374687 Y | 12/2009 |
| TW | M371271 | 12/2009 |

* cited by examiner

*Primary Examiner* — Temesghen Ghebretinsae
*Assistant Examiner* — Paras D Karki
(74) *Attorney, Agent, or Firm* — Cooper Legal Group, LLC

(57) ABSTRACT

A touch-control pattern structure is provided to reinforce capacitive sensing layer to increase the durability and reliability. The touch-control pattern structure comprises a capacitive sensing layer having two intersected electrode groups and a insulating layer located between the two intersected electrode groups at intersections of the two intersected electrode groups, and a reinforcing layer placed on the capacitive sensing layer at the intersection of the two intersected electrode groups at the edge of the insulating layer. Furthermore, the method of forming the touch-control pattern structure is also provided.

22 Claims, 4 Drawing Sheets

TOUCH-CONTROL PATTERN STRUCTURE, MANUFACTURE METHOD THEREOF AND TOUCH PANEL CONTAINING THEREIN

BACKGROUND OF THE INVENTION

This application claims the benefit of China application No. 201110157883.3, filed on May 27, 2011.

FIELD OF THE INVENTION

The present invention relates to touch-control technology, particularly to a touch-control pattern structure, manufacture method and touch panel which have the touch-control pattern structure.

DESCRIPTION OF THE RELATED ART

FIG. 1 is the schematic diagram of the traditional touch-control pattern structure. Please refer to FIG. 1, traditional touch-control pattern structure 100 comprises conductive jumping wires 102 on the surface of a substrate 101, a insulating layer 103 disposed on the conductive jumper wires 102, and a conductive layer 104 disposed on the insulating layer 103. Wherein, this conductive layer 104 includes conductive units in two different directions, horizontal direction and vertical direction, and wire 107. The conductive units 105 of the same group in horizontal direction are connected by the conductive jumping wire 102, while the conductive units 106 of the same group in vertical direction are connected by the wire 107 (the material is consistent with the conductive units of vertical direction). Due to the insulating layer 103 between conductive jumping wires 102 and wires 107, the conductive units on the two directions are insulated from each other, in order to form coupling capacity However, the thickness of insulating layer 103 cannot be designed too thin, it will result in the conductive units 105, 106 in two directions occur coupling puncture to effect the reliability of touch panel. Normally, the thickness the conductive layer 104 is extremely thin, approximately 500~1000 angstrom, while the thickness of insulating layer 103 is approximately 2 um. The insulating layer 103 is thicker than wires 107. Thus, the jumping parts 108 of the wire 107 at the edge of the insulating layer 103 (the jumping parts 108 is omitted in part A in FIG. 1 to show the wire 107 more clearly) can easily occur fracture, to cause the reduction of the durability and reliability of the touch panel.

SUMMARY OF THE INVENTION

One objective of the present invention is to provide a new touch-control pattern structure, it can reinforce capacitive sensing layer to increase the durability and reliability.

The touch-control pattern structure of the present invention comprises a capacitive sensing layer having two intersected electrode groups and an insulating layer located between said two intersected electrode groups at intersections of said two intersected electrode groups, and a reinforcing layer placed on said capacitive sensing layer at the intersection of said two intersected electrode groups at edge of said insulating layer.

Another objective of the present invention is to provide the method of forming the touch-control pattern structure. The method includes the following steps: forming a capacitive sensing layer having two intersected electrode groups on a substrate; forming a insulating layer located between said two intersected electrode groups at intersections of said two intersected electrode groups; and forming a reinforcing layer placed on said capacitive sensing layer at the intersection of said two intersected electrode groups at the edge of said insulating layer.

Moreover, another objective of the present invention is also to provide a touch panel. The touch panel comprises a substrate, the touch-control pattern structure provided by the present invention for generating touch sensing signals, and a controller for receiving and processing said touch sensing signals.

The reinforcing layer is used for reinforcing the jumping parts of the wire at the edge of the insulating layer to avoid fracture. If the reinforcing layer is made of conductive materials, even though the jumping parts of the wire as mentioned above fractured, the reinforcing layer can still play a role of conduction as wires to raise the durability and reliability of the capacity sensing layer as well as the touch panel.

BRIEF DESCRIPTION OF THE DRAWINGS

The skilled artisan will understand that the drawings, described below, are for illustration purposes only. The drawings are not intended to limit the scope of the present teachings in any way. Like reference numerals designate corresponding parts throughout the several views.

DETAILED DESCRIPTION OF THE EMBODIMENTS

Figure 1:
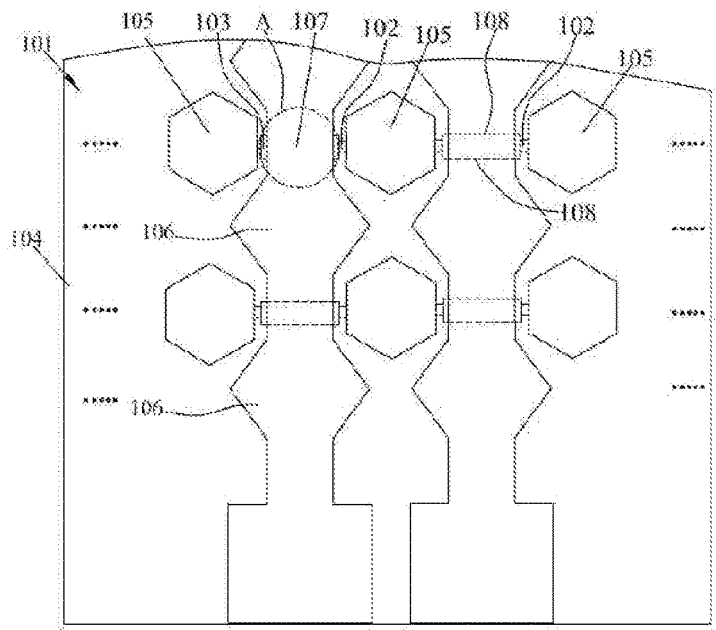
FIG. 1 is a schematic diagram of traditional touch-control pattern structure.
Figure 2:
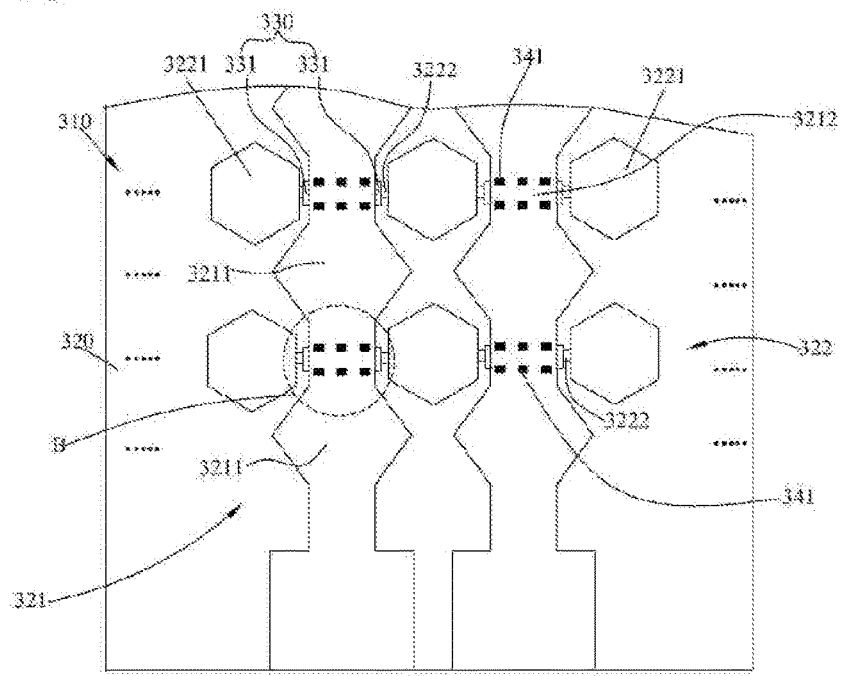
FIG. 2 is a schematic diagram of the first embodiment of the touch-control pattern structure.

FIG. 2 is the schematic diagram of touch-control pattern structure of the present invention. Referring to FIG. 2, a touch-control pattern structure 300 includes the capacitive sensing layer 320 which is disposed on the surface of the substrate 310. The capacitive sensing layer 320 includes a plurality of separated first electrode groups 321 evenly arrayed on the first direction, and a plurality of separated second electrode groups 322 arrayed on the second direction. Wherein, each first electrode group 321 includes a plurality of first electrode cells 3211, and two adjacent first electrode cells 3211 located on the same first electrode group are connected by the first wire 3212. In the same manner, each second electrode group 322 includes a plurality of second electrode cells 3221, and those second electrode cells 3221 are separated from each other. The second electrode cells 3221 are arranged at both sides of the first wires 3212, and the two adjacent second electrode cells 3221 in the same second electrode group 322 are connected by the second wire 3222. Wherein, the first wires 3212 cross over the second wires 3222, and an insulating layer 330 is placed between the first wires 3212 and the second wires 3222 (shown in FIG. 3). Particularly, the insulating layer 330 comprises a plurality of insulating elements 331; each insulating element 331 is sited between each second wire 3222 and the first wire 3212 corresponding to each of second wires 3222 to insulate the first wires 3212 from the second wires 3222.

Figure 3:
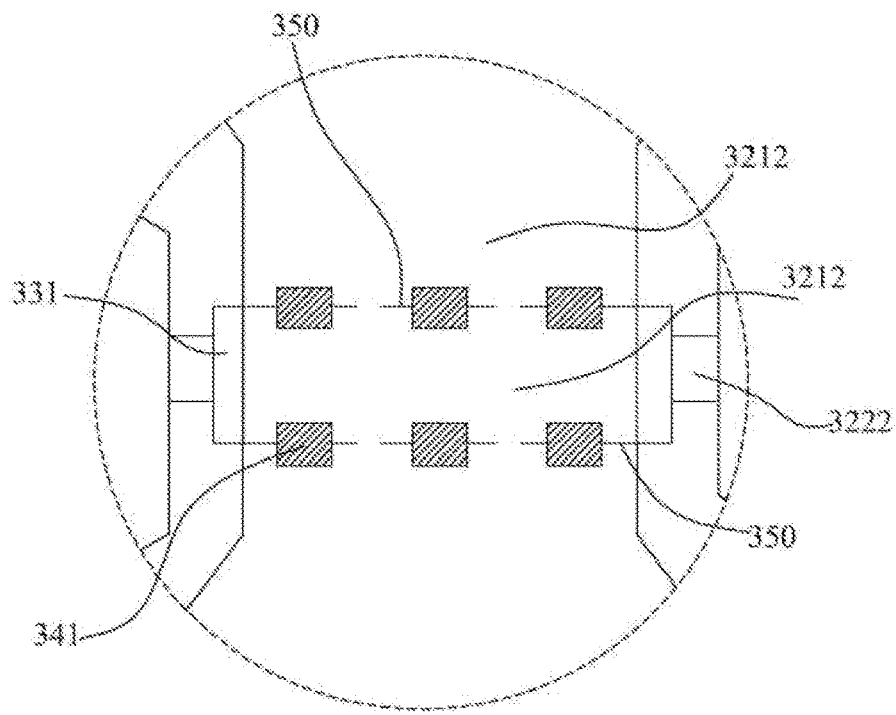
FIG. 3 is a enlarge diagram of Part B of FIG. 2.
Figure 4:
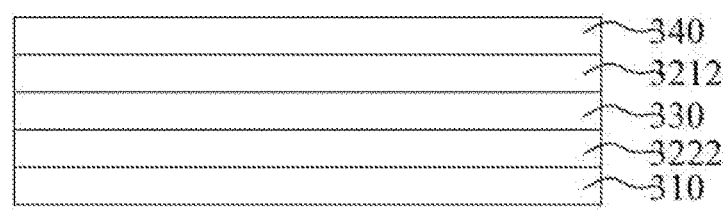
FIG. 4 is a laminar diagram of FIG. 2.

Referring to FIGS. 2, 3 and 4, the second wires 3222 are disposed on the substrate 310, the first wires 3212 are located on the second wires 3222, and the insulating layer 330 is located between them. A reinforcing layer 340, which is disposed on the top of the first wires 3212 opposite to the insulating layer 330, is placed on jumping parts 350 of the first wires 3212 at the edge of the insulating layer 330 (shown in FIG. 3), shown as dotted line in the FIG. 3, in order to reinforce the first wires 3212 to avoid fracture, consequently increase the durability and reliability of the touch panel.

More particularly, the reinforcing layer 340 includes a plurality of reinforcing elements 341. Thus, the reinforcing elements 341 are separated from each other and placed on jumping parts 350 of the first wires 3212 at the edge of the insulating layer 330. Those reinforcing elements 341 are arranged evenly. In alternative embodiments, the reinforcing elements 341 can be arranged unevenly as well. The shape of the reinforcing elements 341 can be dot, piece, strip and so on. The distribution and size of reinforcing elements 341 can be adjusted on the basis of design requirement without affecting the optical performance of touch panel.

In one embodiment, the reinforcing layer 340 is made of conductive materials. Thus, even though the first wires 3212 fractured at the jumping parts 350, the reinforcing layer 340 can still play a role of conduction as wire without affecting the normal performance of the touch panel, to further raise the durability and reliability of the touch panel. The reinforcing layer 340 can be made of transparent conductive materials, e.g. tin indium oxide (ITO), indium zinc oxide or zinc oxide etc. or metal, for its conductivity and ductility, e.g. molybdenum, aluminum or copper etc.

In the above mentioned embodiments, the first electrode cells 3211 and the second electrode cells 3221 are made of transparent conductive materials, such as tin indium oxide (ITO), indium zinc oxide, aluminum or zinc oxide etc. The first wires 3212 and second wires 3222 are also made of transparent conductive materials, such as tin indium oxide (ITO), indium zinc oxide, aluminum or zinc oxide etc., by etching, sputtering or screen-printing. Also, the first wires 3212 and second wires 3222 can be made of metal materials, e.g. copper, aluminum etc. The insulating layer 330 is made of transparent insulating materials.

Furthermore, a plurality of first electrode groups 321 and second electrode groups 322 are connected to a periphery circuit separately (not shown), and those periphery circuit are placed on the surface of the substrate.

The method of forming the first embodiment of the touch-control pattern structure is: referring to FIG. 4, firstly, forming a plurality of second wires 3222 on a surface of the substrate 310, and then forming an insulating layer 330 on the second wires 3222. The insulating layer 330 specifically comprises a plurality of insulating elements 331 covering each corresponding second wire 3222. Afterward, on the same surface of the substrate 310 form the first electrode cells 3211, second electrode cells 3221 and the first wires 3212 connecting first cells 3211 at the same time. Wherein, a plurality of first cells 3211 and the first wires 3212 constitute a plurality of first electrode groups 321, and a plurality of second electrode cells 3221 and the second wires 3222 constitute a plurality of second electrode groups 322. Particularly, each second wire 3222 connects two adjacent second electrode cells 3221 belong to the same second electrode group 322. The first electrode groups 321 and the second electrode groups 322 constitute the capacitive sensing layer 320.

Referring to FIGS. 2 and 3, the first electrode cells 3211, the second electrode cells 3221 and the second wires 3222 are located on the same layer. However, the first wires 3212 are placed over the second wires 3222, and crossed over the insulating elements 331. Therefore, the first wires 3212 are placed higher than the first electrode cells 3211 connected by the first wires 3212, so as to the first wires 3212 form a structure of slope that is the jumping parts 350 (shown in FIG. 3 as dotted line) existed at the edge of the insulating elements 331. Thus, the jumping parts 350 of the first wires 3212 will generate stress to cause itself become weaker which condition will be more apparent if the first wires 3212 are made of transparent conductive materials (ITO) or indium zinc oxide aluminum or zinc oxide etc.

After forming the capacitive sensing layer 320, as shown in FIG. 3 and FIG. 4, on the jumping parts 350 of the first wires 3212 at the edge of the insulating elements 331 form the reinforcing layer 340 which comprises a plurality of reinforcing elements 341. Those reinforcing elements 341 are arranged evenly. In alternative embodiments, the reinforcing elements 341 can be arranged unevenly as well. The shape of the reinforcing elements 341 can be dot, piece, strip and so on. The distribution and size of reinforcing elements 341 can be adjusted on the basis of design requirement without affecting the optical performance of touch panel.

In one embodiment, the reinforcing layer 340 is made of conductive materials. Thus, even though the first wires 3212 fractured at the jumping parts 350, the reinforcing layer 340 can still play a role of conduction as wire without affecting the normal performance of the touch panel, to further raise the durability and reliability of the touch panel. The reinforcing layer 340 can be made of transparent conductive materials, e.g. tin indium oxide (ITO), indium zinc oxide or zinc oxide etc., or metal, for its conductivity and ductility, e.g. molybdenum, aluminum or copper etc.

Furthermore, the manufacture method also includes the step of forming a periphery circuit (not shown) which is placed on the surface of the substrate 310. The first electrode groups 321 and the second electrode groups 322 are both connected with the periphery circuit separately. In one embodiment, the periphery circuit and the reinforcing layer 340 are formed in one step.

The manufacture method can also be implemented in different order. After forming the second wire 3222, the second electrode cells 3221 are form on the same surface of the substrate 310, and the second wires 3222 connect the adjacent second electrode cells 3221. After forming the insulating layer 330, the first electrode cells 3211 and the first wires 3212 are formed. Wherein the first wires 3212 connecting the adjacent first electrode cells 3211 cross over the insulating layer 330. Finally, the reinforcing layer 340 is formed on the first wires 3212 mentioned above.

Figure 5:
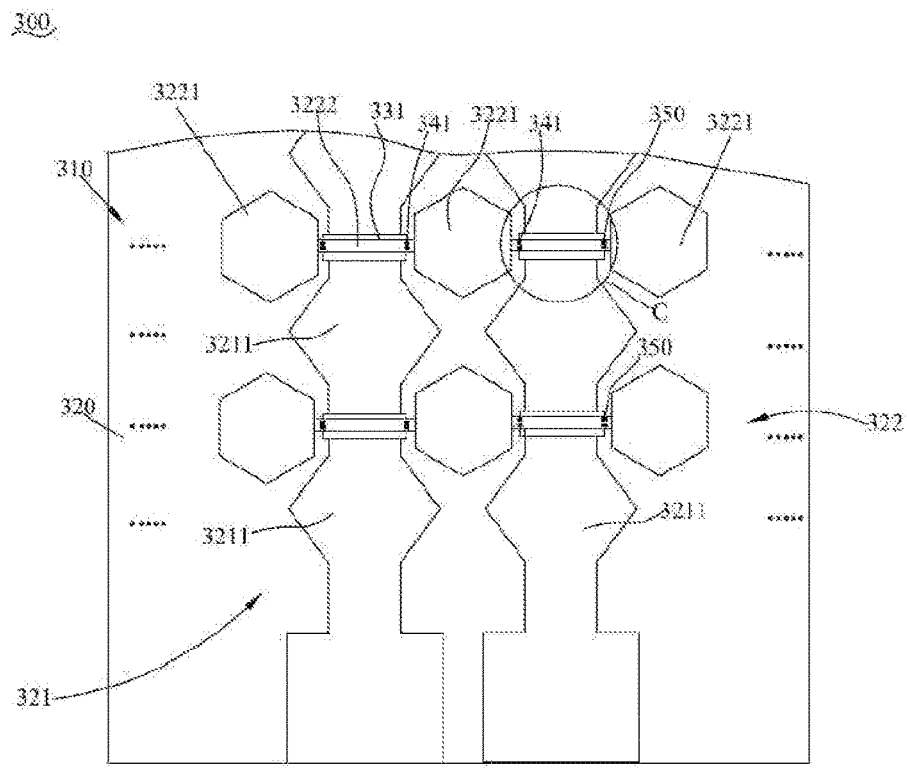
FIG. 5 is a schematic diagram of the second embodiment of the touch-control pattern structure.

Referring to FIG. 5, another embodiment of the present invention provides a touch-control pattern structure 300. The touch-control pattern structure 300 includes the capacitive sensing layer 320 which is disposed on the surface of the substrate 310. The capacitive sensing layer 320 includes a plurality of separated first electrode groups 321 evenly arrayed on the first direction, and a plurality of separated second electrode groups 322 arrayed on the second direction. Wherein, each first electrode group 321 includes a plurality of first electrode cells 3211, and two adjacent first electrode cells 3211 located on the same first electrode group are connected by the first wire 3212. In the same manner, each second electrode group 322 includes a plurality of second electrode cells 3221, and those second electrode cells 3221 are separated from each other. The second electrode cells 322 are arranged at the both sides of the first wires 3212, and the two adjacent second electrode cells 3221 in the same second electrode group 322 are connected by the second wire 3222. Wherein, the first wires 3212 cross over the second wires 3222, and an insulating layer 330 is placed between the first wires 3212 and the second wires 3222 (shown in FIG. 3). Particularly, the insulating layer 330 comprises a plurality of insulating elements 331; each insulating element 331 is sited between each second wire 3222 and the first wire 3212 corresponding to each of second wires 3222 to insulate the first wires 3212 from the second wires 3222.

Figure 6:
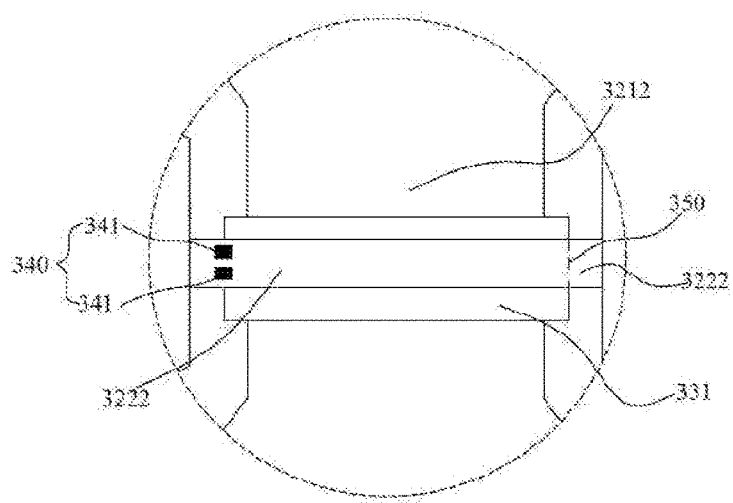
FIG. 6 is a enlarge diagram of Part C of FIG. 5.
Figure 7:
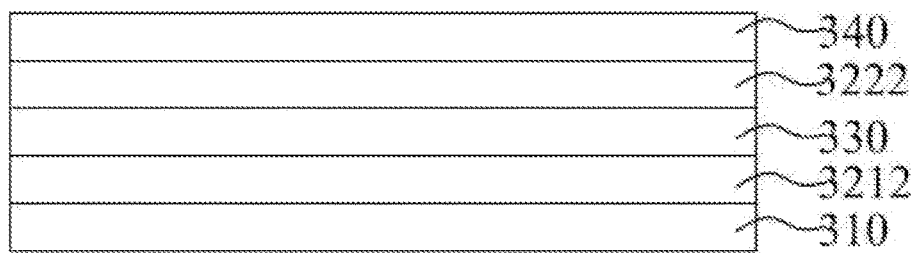
FIG. 7 is a laminar diagram of FIG. 5.

Referring to FIG. 7, the first wires 3212 are disposed on the substrate 310, the second wires 3222 are located on the first wires 3212, with the insulating layer 330 located between them. A reinforcing layer 340, which is disposed on the top of the second wires 3222 opposite to the insulating layer 330, is placed on jumping parts 350 of the second wires 3222 at the edge of the insulating layer 330, shown as dotted line in the FIG. 6, in order to reinforce the second wires 3222 to avoid fracture, consequently increase the durability and reliability of the touch panel.

More particularly, the reinforcing layer 340 includes a plurality of reinforcing elements 341. Thus, the reinforcing elements 341 are separated from each other and placed on jumping parts 350 of the second wires 3222 at the edge of the insulating layer 330. Those reinforcing elements 341 are arranged evenly. In alternative embodiments, the reinforcing elements 341 can be arranged unevenly as well. The shape of the reinforcing elements 341 can be dot, piece, strip and so on. The distribution and size of reinforcing elements 341 can be adjusted on the basis of design requirement without affecting the optical performance of touch panel.

In one embodiment, the reinforcing layer 340 is made of conductive materials. Thus, even though the second wires 3222 fractured at the jumping parts 350, the reinforcing layer 340 can still play a role of conduction as wire without affecting the normal performance of the touch panel, to further raise the durability and reliability of the touch panel. The reinforcing layer 340 can be made of transparent conductive materials, e.g. tin indium oxide (ITO), indium zinc oxide or zinc oxide etc., or metal, for its conductivity and ductility, e.g. molybdenum, aluminum or copper etc.

In the above mentioned embodiments, the first electrode cells 3211 and second electrode cells 3221 are made of transparent conductive materials, such as tin indium oxide (ITO), indium zinc oxide, aluminum or zinc oxide etc. The first wires 3212 and second wires 3222 are also made of transparent conductive materials, such as tin indium oxide (ITO), indium zinc oxide, aluminum or zinc oxide etc., by etching, sputtering or screen-printing. Also, the first wires 3212 and second wires 3222 can be made of metal materials, e.g. copper, aluminum etc. The insulating layer 330 is made of transparent insulating materials.

Furthermore, a plurality of first electrode groups 321 and second electrode groups 322 are connected to a periphery circuit separately (not shown), and those periphery circuit are placed on the surface of the substrate.

Referring to FIG. 5 to FIG. 7, Firstly, forming a plurality of first electrode cells 3211, second electrode cells 3221 and the first wires 3212 connecting first cells 3211 on a surface of the substrate 310 at the same time, then forming an insulating layer 330 on the first wires 3212. The insulating layer 330 specifically comprises a plurality of insulating elements 331 covering each corresponding first wire 3212. Afterward, a plurality of second wires 3222 are formed on each insulating element 331. Wherein, a plurality of first cells 3211 and the first wires 3212 constitute a plurality of first electrode groups 321, and a plurality of second electrode cells 3221 and the second wires 3222 constitute a plurality of second electrode groups 322. Particularly, each second wire 3222 connects two adjacent second electrode cells 3221 belong to the same second electrode group 322. The first electrode groups 321 and the second electrode groups 322 constitute the capacitive sensing layer 320.

Referring to FIG. 5 to FIG. 7, the first electrode cells 3211, the second electrode cells 3221 and the first wires 3212 are located on the same layer. However, the second wires 3222 are placed over the first wires 3212, and crossed over the insulating elements 331. Therefore, the second wires 3222 are placed higher than the second electrode cells 3221 connected by the second wires 3222, so as to the second wires 3222 form a structure of slope that is the jumping parts 350 (shown in FIG. 6 as dotted line) existed at the edge of the insulating elements 331. Thus, the jumping parts 350 of the second wires 3222 will generate stress to cause itself become weaker. If the second wires 3222 are made of transparent conductive materials (ITO) or indium zinc oxide aluminum or zinc oxide etc., it will be more apparent.

After forming the capacitive sensing layer 320, on the jumping parts 350 of the second wires 3222 at the edge of the insulating elements 331 form the reinforcing layer 340 which comprises a plurality of reinforcing elements 341. Those reinforcing elements 341 are arranged evenly. In alternative embodiments, the reinforcing elements 341 can be arranged unevenly as well. The shape of the reinforcing elements 341 can be dot, piece, strip and so on. The distribution and size of reinforcing elements 341 can be adjusted on the basis of design requirement without affecting the optical performance of touch panel.

In another embodiment, the reinforcing layer 340 is made of conductive materials. Thus, even though the second wires 3222 fractured at the jumping parts 350, the reinforcing layer 340 can still play a role of conduction as wire without affecting the normal performance of the touch panel, to further raise the durability and reliability of the touch panel. The reinforcing layer 340 can be made of transparent conductive materials, e.g. tin indium oxide (ITO), indium zinc oxide or zinc oxide etc. or metal, for its conductivity and ductility, e.g. molybdenum, aluminum or copper etc.

Furthermore, the manufacture method also includes the step of forming a periphery circuit (not shown) which is placed on the surface of the substrate 310. The first electrode groups 321 and the second electrode groups 322 are both connected with the periphery circuit separately. In one embodiment, the periphery circuit and the reinforcing layer 340 are formed in one step.

Need to be explained is, the manufacture technology of first electrode cell 3211, the second electrode cell 3221 and the first wire 3212 mentioned above are formed through the technology of well-known etching, sputtering and screen printing etc.

The present invention provides a touch panel which includes the touch-control pattern structure 300 as mentioned above as well as the substrate 310. It can be used for generating touch sensing signals; and the periphery circuit is used for transmitting the touch sensing signals to a controller (not shown), the function of the controller is to receive and process the touch sensing signals.

While certain embodiments have been shown and described, various modifications and substitutions may be made thereto without departing from the spirit and scope of the invention. Therefore, it is to be understood that the present invention has been described by way of illustration and not limitations.

What is claimed is:

1. A touch-control pattern structure, comprising: a capacitive sensing layer comprising:
   a first electrode group comprising a first electrode cell and a second electrode cell;
   a first wire extending in a first direction from said first electrode cell to said second electrode cell; and
   a second electrode group comprising a third electrode cell and a fourth electrode cell;
   an insulating layer located over said first wire;
   a second wire located over said insulating layer and extending in a second direction from said third electrode cell to said fourth electrode cell, wherein
      said insulating layer is located between said first wire and said second wire at an intersection of said first wire and said second wire,
      said second wire comprises a sloped sidewall; and a reinforcing layer located over said second wire and in contact with said sloped sidewall of a second wire, wherein:
      said reinforcing layer is made of a conductive material,
      said reinforcing layer comprises one or more reinforcing elements, and
      each of said reinforcing elements crosses no more than one edge of said insulating layer at said intersection of said first wire and said second wire,
   wherein, a first portion of said second wire extends from a top of said insulating layer to a top of said third electrode cell,
      a first reinforcing element of said one or more reinforcing elements and a second reinforcing element of said one or more reinforcing elements are in contact with said first portion of said second wire, said first reinforcing element is spaced apart from said second reinforcing element in said first direction, and
   wherein: said intersection comprises a center region and edge regions, and
   said one or more reinforcing elements are located only in said edge regions.

2. The touch-control pattern structure of claim 1, wherein said second direction is perpendicular to said first direction.

3. The touch-control pattern structure of claim 1, wherein said conductive material is metal.

4. The touch-control pattern structure of claim 1, wherein said conductive material is transparent conductive material.

5. The touch-control pattern structure of claim 2, wherein said first wire and said second wire are made of transparent conductive material.

6. The touch-control pattern structure of claim 2, wherein said first wire and said second wire are made of metal.

7. The touch-control pattern structure of claim 1, wherein said first electrode cell, said second electrode cell, said third electrode cell, and said fourth electrode cell are made of transparent conductive material.

8. The touch-control pattern structure of claim 1, wherein:
   said second wire comprises a first planar top surface and a second planar top surface,
   said sloped sidewall extends from said first planar top surface to said second planar top surface, and
   said reinforcing layer continuously contacts said sloped sidewall between said first planar top surface and said second planar top surface.

9. The touch-control pattern structure of claim 1, further comprising a periphery circuit connected to said first electrode group and said second electrode group.

10. A method of forming a touch-control pattern structure, comprising:
   forming a first electrode group, a second electrode group, and a first wire on a substrate, wherein:
      said first electrode group comprises a first electrode cell and a second electrode cell,
      said second electrode group comprises a third electrode cell and a fourth electrode cell, and
      said first wire extends in a first direction from said first electrode cell to said second electrode cell;
   forming an insulating layer over said first wire; forming a second wire over said insulating layer, wherein:
      said second wire extends in a second direction from said third electrode cell to said fourth electrode cell, said insulating layer is located between said first wire and said second wire at an intersection of said first wire and said second wire, and said second wire comprises a sloped sidewall; and
   forming a reinforcing layer over said second wire, wherein:
      said reinforcing layer is in contact with said sloped sidewall of said second wire, said reinforcing layer is made of a conductive material, said reinforcing layer comprises one or more reinforcing elements, and each of said reinforcing elements crosses no more than one edge of said insulating layer at said intersection of said first wire and said second wire,
   wherein, a first portion of said second wire extends from a top of said insulating layer to a top of said third electrode cell,
      a first reinforcing element of said one or more reinforcing elements and a second reinforcing element of said one or more reinforcing elements arc formed to contact said first portion of said second wire, and
      said first reinforcing element is spaced apart from said second reinforcing element in said first direction,
   wherein, said intersection comprises a center region and edge regions, and
   said one or more reinforcing elements are formed only in said edge regions.

11. The method of forming a touch-control pattern structure of claim 10, wherein said first direction is perpendicular to said second direction.

12. The method of forming a touch-control pattern structure of claim 10, wherein forming said first electrode group, said second electrode group, and said first wire comprises screen printing said first electrode group, said second electrode group, and said first wire onto said substrate.

13. The method of forming a touch-control pattern structure of claim 11, further comprising forming a periphery circuit connecting to said first electrode group and said second electrode group.

14. The method of forming a touch-control pattern structure of claim 13, wherein said periphery circuit and said reinforcing layer are formed concurrently.

15. A touch panel comprising:
   a substrate;
   said touch-control pattern structure of claim 1 for generating touch sensing signals; and
   a controller for receiving and processing said touch sensing signals.

16. The touch-control pattern structure of claim 3, wherein said metal is selected from a group consisting of molybdenum, aluminum and copper.

17. The method of forming a touch-control pattern structure of claim 10, wherein said conductive material is metal.

18. The method of forming a touch-control pattern structure of claim 17, wherein said metal is selected from a group consisting of molybdenum, aluminum and copper.

19. The method of forming a touch-control pattern structure of claim 10, wherein said first electrode cell, said second electrode cell, said third electrode cell, said fourth electrode cell, and said first wire are formed on a same surface of said substrate.

20. The touch-control pattern structure of claim 1, wherein:
   a width of each of said reinforcing elements, as measured in said first direction, is greater than a length of each of said reinforcing elements, as measured in said second direction.

21. The touch-control pattern structure of claim 1, wherein said second electrode group and said reinforcing layer are made from a same material.

22. The touch-control pattern structure of claim 1, wherein the reinforcing layer and the insulating layer are located on opposite sides of the second wire.

* * * * *